US008615350B2

(12) United States Patent
Goto et al.

(10) Patent No.: US 8,615,350 B2
(45) Date of Patent: Dec. 24, 2013

(54) GUIDANCE DEVICE, GUIDANCE METHOD, AND GUIDANCE PROGRAM (75) Inventors: Hirohiko Goto, Okazaki (JP); Toshiaki Niwa, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 533 days.

(21) Appl. No.: 12/828,522

(22) Filed: Jul. 1, 2010

(65) Prior Publication Data
US 2011/0015819 A1 Jan. 20, 2011

(30) Foreign Application Priority Data

Jul. 16, 2009 (JP) ................................ 2009-167783

(51) Int. Cl.
*G06F 19/00* (2011.01)
*G06F 7/70* (2006.01)
*B60K 1/00* (2006.01)
*B60Q 1/00* (2006.01)

(52) U.S. Cl.
USPC ......... 701/70; 180/65.31; 116/28 R; 340/453; 318/376

(58) Field of Classification Search
USPC ............ 701/1, 22, 31, 70; 303/146, 151, 152, 303/191; 180/65, 65.1, 65.21, 65.29, 65.8; 290/40; 340/439, 425.5, 438, 453, 455; 382/106
See application file for complete search history.

(56) References Cited

U.S. PATENT DOCUMENTS

| | | | |
|---|---|---|---|
| 6,249,720 B1 * | 6/2001 | Kubota et al. ...................... 701/1 |
| 6,343,246 B1 * | 1/2002 | Matsubara et al. ............. 701/22 |
| 6,480,106 B1 * | 11/2002 | Crombez et al. .............. 340/461 |
| 6,508,523 B2 * | 1/2003 | Yoshino ......................... 303/152 |
| 6,563,230 B2 * | 5/2003 | Nada ............................ 290/40 C |
| 7,047,120 B2 * | 5/2006 | Perach et al. .................... 701/71 |
| 7,409,280 B2 * | 8/2008 | Nakamura et al. .............. 701/70 |
| 7,472,766 B2 * | 1/2009 | Yamamoto et al. .......... 180/65.1 |
| 7,506,941 B2 * | 3/2009 | Miller et al. .................. 303/191 |
| 7,750,796 B2 * | 7/2010 | Borroni-Bird et al. ....... 340/438 |

(Continued)

FOREIGN PATENT DOCUMENTS

DE 102005058829 * 12/2005
DE 10 2005 058 829 A1 6/2007

(Continued)

OTHER PUBLICATIONS

Oct. 29, 2010 European Search Report issued in EP 10 16 8078.

(Continued)

*Primary Examiner* — Fadey Jabr
*Assistant Examiner* — Luis A Martinez Borrero
(74) *Attorney, Agent, or Firm* — Oliff & Berridge, PLC (57) ABSTRACT Guidance devices, methods, and programs acquire a current speed of a vehicle and calculate a regeneration upper limit operation amount of the regenerative brake based on the current speed of the vehicle. The devices, methods, and programs acquire a deceleration target speed, acquire a deceleration target position, calculate a distance to the deceleration target position, and calculate a deceleration required operation amount of the brake pedal required for reducing the current speed of the vehicle to the deceleration target speed at the deceleration target position based on the acquired current speed of the vehicle, the acquired deceleration target speed, and the calculated distance to the deceleration target position. The devices, methods, and programs communicate guidance regarding the operation amount of the brake pedal based on the calculated regeneration upper limit operation amount and the calculated deceleration required operation amount.

14 Claims, 5 Drawing Sheets

(56) References Cited

U.S. PATENT DOCUMENTS

| | | | |
|---|---|---|---|
| 7,880,597 B2* | 2/2011 | Uchida | 340/439 |
| 7,881,848 B2* | 2/2011 | Hayakawa et al. | 701/70 |
| 7,890,240 B2* | 2/2011 | Karnjate et al. | 701/70 |
| 7,898,405 B2* | 3/2011 | Burke et al. | 340/461 |
| 8,027,773 B2* | 9/2011 | Ahn | 701/70 |
| 8,112,194 B2* | 2/2012 | Buur et al. | 701/31.8 |
| 8,123,310 B2* | 2/2012 | Haupt et al. | 303/152 |
| 8,135,526 B2* | 3/2012 | Minarcin et al. | 701/70 |
| 8,184,862 B2* | 5/2012 | Nagaoka et al. | 382/106 |
| 8,248,221 B2* | 8/2012 | Crombez | 340/439 |
| 8,251,463 B2* | 8/2012 | Worrel | 303/151 |
| 8,255,106 B2* | 8/2012 | Vespasien | 701/22 |
| 8,280,601 B2* | 10/2012 | Huang et al. | 701/70 |
| 8,301,365 B2* | 10/2012 | Niwa et al. | 701/532 |
| 8,315,751 B2* | 11/2012 | Krueger et al. | 701/22 |
| 2001/0024062 A1* | 9/2001 | Yoshino | 303/152 |
| 2003/0137278 A1* | 7/2003 | Kondo | 320/132 |
| 2003/0230933 A1* | 12/2003 | Schneider et al. | 303/146 |
| 2005/0269875 A1 | 12/2005 | Maki et al. | |
| 2006/0025897 A1* | 2/2006 | Shostak et al. | 701/1 |
| 2007/0208468 A1* | 9/2007 | Sankaran et al. | 701/29 |
| 2007/0295544 A1* | 12/2007 | Borroni-Bird et al. | 180/165 |
| 2008/0042489 A1* | 2/2008 | Lewis et al. | 303/152 |
| 2010/0277495 A1* | 11/2010 | Taguchi et al. | 345/589 |
| 2011/0023772 A1* | 2/2011 | Crombez | 116/28 R |
| 2011/0082632 A1* | 4/2011 | Rowker et al. | 701/70 |
| 2012/0179346 A1* | 7/2012 | Aldighieri et al. | 701/70 |

FOREIGN PATENT DOCUMENTS

| | | | |
|---|---|---|---|
| JP | A-2006-321429 | | 11/2006 |
| JP | A-2007-008203 | | 1/2007 |
| JP | 2007186045 A | * | 7/2007 |
| JP | A-2007-186045 | | 7/2007 |
| JP | A-2007-221889 | | 8/2007 |
| JP | 2007314100 A | * | 12/2007 |
| JP | A-2007-314100 | | 12/2007 |
| JP | A-2008-114791 | | 5/2008 |
| JP | B2-4325626 | | 9/2009 |

OTHER PUBLICATIONS

Japanese Patent Office, Notification of Reason(s) for Refusal mailed May 29, 2013 in Japanese Patent Application No. 2009-167783 w/Partial English-language Translation.

* cited by examiner

GUIDANCE DEVICE, GUIDANCE METHOD, AND GUIDANCE PROGRAM

INCORPORATION BY REFERENCE

The disclosure of Japanese Patent Application No. 2009-167783 filed on Jul. 16, 2009 including the specification, drawings and abstract is incorporated herein by reference in its entirety.

BACKGROUND

1. Related Technical Fields

Related technical fields include guidance device, a guidance method, and a guidance program.

2. Description of the Related Art

A display device has been proposed for a hybrid vehicle using a motor and an engine as a drive source, in which areas that correspond to distribution ratios of a braking force of the motor and a braking force of a hydraulic brake are displayed during deceleration of the vehicle (see Japanese Patent Application Publication No. JP-A-2007-314100, paragraph 0033, for example). A running control system has also been proposed for a hybrid vehicle that indicates a level of regeneration energy recovered in a currently performed brake operation (see Japanese Patent Application Publication No. JP-A-2007-186045, paragraph 0046, for example).

SUMMARY

The basic object of brake operation is to decelerate the current speed of the vehicle to a desired speed at a deceleration target position ahead. However, in conventional devices such as those described above, a brake operation amount required for decelerating to a desired speed at a deceleration target position is not taken into consideration, and only the level of regenerated energy recovered from the current brake operation and the like is displayed. Therefore, guidance cannot be provided to a driver regarding a brake operation amount suitable for regeneration energy recovery and for safety.

Exemplary implementations of the broad inventive principles described herein provide a guidance device, a guidance method, and a guidance program, which provide guidance to a driver regarding a brake operation amount suitable for regeneration energy recovery and for safety.

Exemplary implementations provide guidance devices, methods, and programs that acquire a current speed of the vehicle and calculate a regeneration upper limit operation amount, which is an upper limit value of the operation amount of the brake pedal when only the regenerative brake is operated, based on the current speed of the vehicle. The devices, methods, and programs acquire a deceleration target speed, acquire a deceleration target position, calculate a distance to the deceleration target position, and calculate a deceleration required operation amount of the brake pedal required for reducing the current speed of the vehicle to the deceleration target speed at the deceleration target position based on the acquired current speed of the vehicle, the acquired deceleration target speed, and the calculated distance to the deceleration target position. The devices, methods, and programs create guidance regarding the operation amount of the brake pedal based on the calculated regeneration upper limit operation amount and the calculated deceleration required operation amount, and cause the created guidance to be communicated to a user.

BRIEF DESCRIPTION OF THE DRAWINGS

Following FIGS. 3A to 3C, FIGS. 4A to 4C show display examples of the regeneration upper limit operation amount, the required operation amount for safe deceleration, and the current operation amount on a display.

DETAILED DESCRIPTION OF EXEMPLARY IMPLEMENTATIONS

Hereinafter, an example of a guidance device, a guidance method, and a guidance program will be described in detail with reference to the drawings.

Constitution

Figure 1:
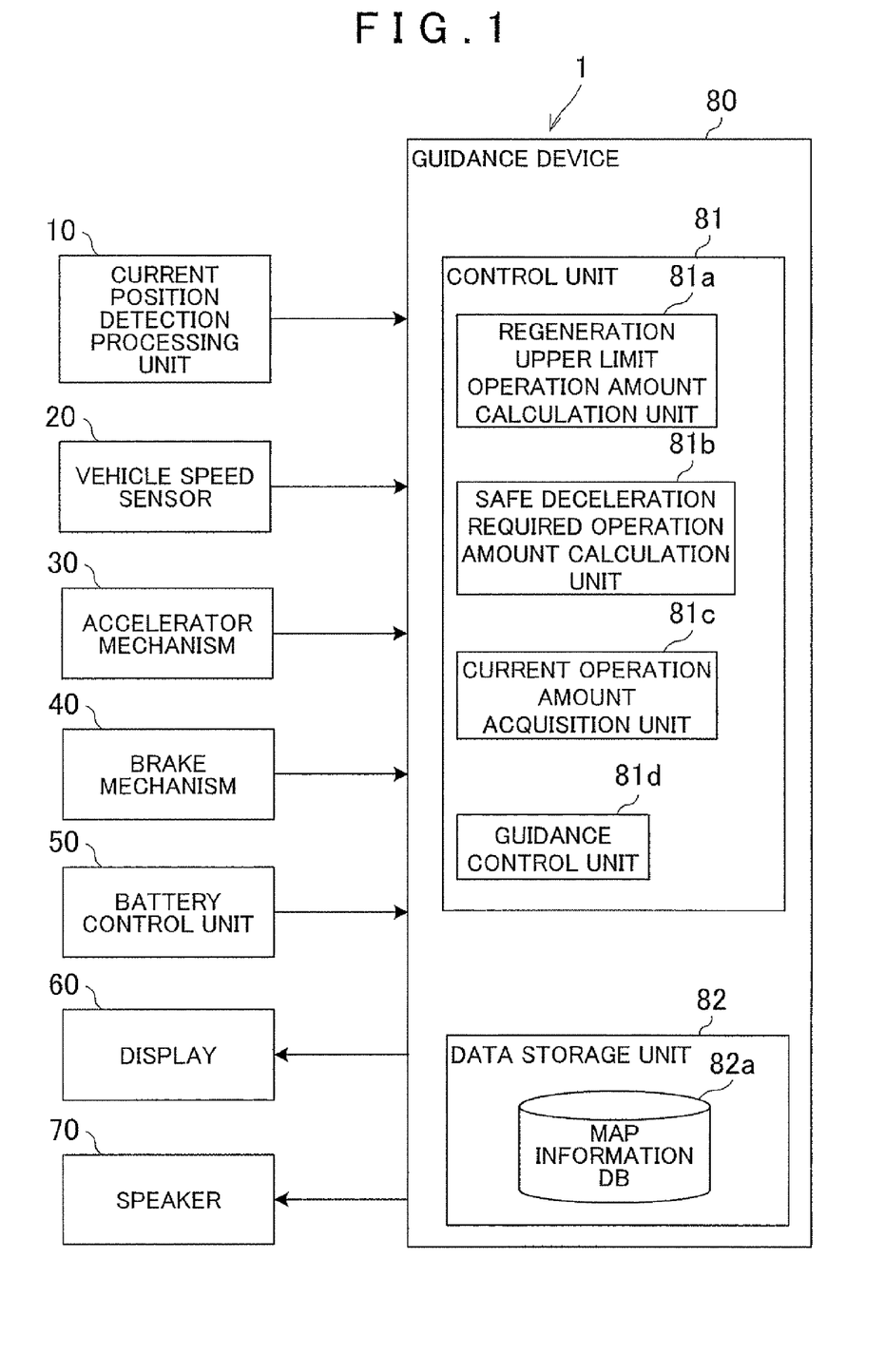
FIG. 1 is a block diagram that illustrates an exemplary guidance system.

The constitution of a guidance system according to the present example will be described first. FIG. 1 is a block diagram that illustrates a guidance system 1 according to the present example. As shown in FIG. 1, the guidance system 1 includes a current position detection processing unit 10, a vehicle speed sensor 20, an accelerator mechanism 30, a brake mechanism 40, a battery control unit 50, a display 60, a speaker 70, and a guidance device 80.

Constitution: Current Position Detection Processing Unit

The current position detection processing unit 10 detects the current position of a vehicle (referred to as a "host vehicle" below) installed with the guidance device 80. Specifically, the current position detection processing unit 10 has at least one of a GPS, a geomagnetic sensor, a distance sensor, and a gyroscopic sensor (none of which are shown in the drawing), and detects the current position (coordinates), heading, and the like of the host vehicle using commonly known methods.

Constitution: Vehicle Speed Sensor

The vehicle speed sensor 20 outputs a rotational speed or the like of a wheel of the host vehicle. A commonly known vehicle speed sensor 20 may be used.

Constitution: Accelerator Mechanism

The accelerator mechanism 30 is a driving mechanism of the host vehicle. The accelerator mechanism 30 controls an engine and an electric motor in accordance with an operation amount (a depression amount) of an accelerator pedal (not shown in the drawing). A commonly known mechanism may constitute the accelerator mechanism 30. The accelerator mechanism 30 outputs a current operation amount of the accelerator pedal, namely an accelerator pedal current operation amount, to the guidance device 80.

Constitution: Brake Mechanism

The brake mechanism 40 is a braking mechanism of the host vehicle. The brake mechanism 40 is constituted from a combination of two types of brakes, a friction brake (hydraulic brake) and a regenerative brake. These two types of brakes can be operated by a brake pedal (not shown in the drawing). Specifically, the host vehicle is constituted as a hybrid vehicle having the engine and the electric motor as a drive source, wherein electric power regenerated by the braking energy of the host vehicle can be accumulated in a battery and the electric power of the battery used to drive the electric motor and the like (all of which are not shown in the drawing). The brake pedal is provided with a pedal sensor (not shown in the drawing) that detects an operation amount (a depression amount, or an amount excluding so-called play) of the brake pedal. Based on the output of the pedal sensor, a control is performed by cooperative control of the friction brake and the regenerative brake. This cooperative control of the friction brake and the regenerative brake is performed using a commonly known method through a brake control unit, a hydraulic mechanism, and the like not shown in the drawing. The brake mechanism 40 outputs a current operation amount of the brake pedal, namely a brake pedal current operation amount, to the guidance device 80.

Constitution: Battery Control Unit

The battery control unit 50 controls the battery that accumulates regenerated electric power. The battery control unit 50 outputs battery charge information that is information pertaining to the charge status of the battery to the guidance device 80.

Constitution: Display

The display 60 displays an image provided by the guidance device 80. The specific constitution of the display 60 may take on any form, and a flat panel display such as a commonly known liquid crystal display or organic EL display may be used.

Constitution: Speaker

The speaker 70 is an output unit that outputs various types of audio based on a control of the guidance device 80. The specific voice output from the speaker 70 may take on any form, and it is possible to output a synthetic voice that is generated as necessary or a pre-recorded voice.

Constitution: Guidance Device

The guidance device 80 is a guidance control unit that performs a guidance control pertaining to the operation amount of the brake pedal, and includes a controller (e.g., control unit 81) and a data storage unit 82.

Constitution: Guidance Device—Control Unit

The control unit 81 controls the guidance device 80. Specifically, the control unit 81 is a computer with a configuration that includes a CPU, various programs that are interpreted and executed in the CPU (including an OS and other basic control programs, and application programs that are activated in the OS to carry out specific functions), and an internal memory such as a RAM for storing the programs and various data. In particular, a program that implements the guidance process algorithm described below may be installed in the guidance device 80 through any storage medium or network, and configures various portions of the control unit 81 in substance.

The control unit 81 includes a regeneration upper limit operation amount calculation unit 81a, a safe deceleration required operation amount calculation unit 81b, a current operation amount acquisition unit 81c, and a guidance control unit 81d in terms of functional concept.

The regeneration upper limit operation amount calculation unit 81a calculates an upper limit value of the operation amount of the brake pedal when only the regenerative brake is operated (hereinafter, a "regeneration upper limit operation amount") based on the current speed of the host vehicle.

The safe deceleration required operation amount calculation unit 81b calculates the operation amount of the brake pedal required for slowing the current speed of the host vehicle to a deceleration target speed at a deceleration target position (hereinafter, a "deceleration required operation amount") based on the current speed of the host vehicle, the deceleration target speed, and the distance to the deceleration target position.

Here, the deceleration target position is a targeted position at which the deceleration should be achieved when decelerating the current speed of the host vehicle, and includes a position automatically specified based on only map information (e.g. a feature such as a stop point, an ETC gate of an interchange or the like, a right- or left-turn point, a T-junction, an entry to a curve having at least a predetermined curvature, or an obstacle), and any position set in the map information by the driver of the host vehicle (e.g. a stop-off location, or a destination). The deceleration target speed is a speed that should be used when the host vehicle reaches at the deceleration target position. Unless specifically noted, deceleration shall include stopping, and therefore, the deceleration target position includes a stop target position and the deceleration target speed at the stop target position is a speed of zero. Here, the safe deceleration required operation amount calculation unit 81b calculates an operation amount required for deceleration from the current position to the deceleration target position when decelerating at a constant deceleration G. In this case, the constant deceleration G is a deceleration G at which the behavior of the host vehicle is stabilized (hereinafter, a "safe deceleration G"). The safe deceleration G is not a fixed value, and instead is a value that varies depending on the current speed of the vehicle, the deceleration target speed, and the distance to the deceleration target position when the safe deceleration G is calculated. The operation amount required for deceleration when decelerating at the safe deceleration G described above is called a "safe deceleration required operation amount."

The current operation amount acquisition unit 81c acquires the current operation amount that is the current operation amount of the brake pedal.

The guidance control unit 81d performs a guidance control pertaining to the operation amount of the brake pedal based on the regeneration upper limit operation amount calculated by the regeneration upper limit operation amount calculation unit 81a, and the safe deceleration required operation amount calculated by the safe deceleration required operation amount calculation unit 81b. The processes that are executed by these functional elements of the control unit 81 will be described in detail later.

Constitution: Guidance Device—Data Storage Unit

The data storage unit 82 is a storage unit that stores programs and various data required for operation of the guidance device 80, and has a configuration that uses a hard disk (not shown in the drawing) as an external memory device, for example. However, any other storage mediums, including a magnetic storage medium such as a magnetic disk or an optical storage medium such as a DVD or Btu-ray disc, can be used in place of or in combination with the hard disk.

The data storage unit 82 has a map information database 82a. (Note that database will be abbreviated to "DB" below.) The map information DB 82a is a map information storage unit that stores map information. The map information is information required for specifying various positions, including intersections and stop points. The map information may be configured to include, for example, intersection data (such as intersection coordinates), map display data for displaying a map on the display 60, and the like. Further, the data storage unit 82 may store, in any format, information required for acquiring the regeneration upper limit operation amount, the safe deceleration required operation amount, and the current operation amount.

Processing

Figure 2:
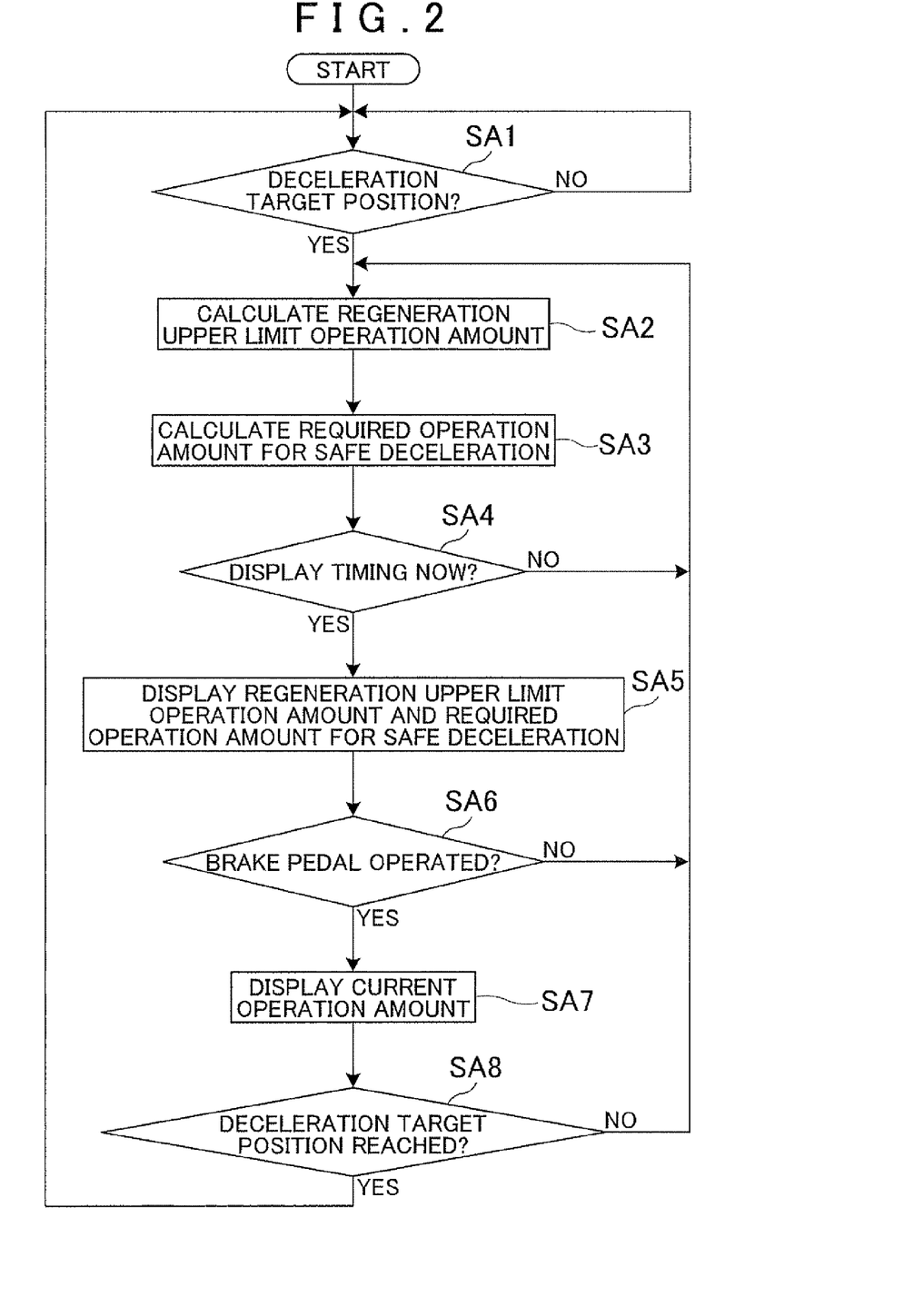
FIG. 2 is a flowchart of an exemplary guidance process.

A guidance process executed by the guidance device 80 with the above constitution will be explained below. FIG. 2 is a flowchart illustrating an exemplary guidance process algorithm. The exemplary process may be implemented, for example, by one or more components of the above-described guidance system 1. For example, the exemplary method may be implemented by the control unit 81 executing a computer program stored in a RAM, a ROM, and/or the data storage unit 82. However, even though the exemplary structure of the above-described guidance system 1 may be referenced in the description, it should be appreciated that the structure is exemplary and the exemplary process need not be limited by any of the above-described exemplary structure. This guidance process may be automatically activated after starting the engine of the host vehicle.

Following activation of the guidance process, the control unit 81 continuously monitors whether there is a deceleration target position ahead of the host vehicle (SA1). The determination regarding whether there is a deceleration target position may be a determination of whether there is a deceleration target position that matches a predetermined condition on the road traveled by the host vehicle (on a route traveled if a travel route is set for the host vehicle, and on a road currently traveled by the host vehicle if no travel route is set for the host vehicle). The predetermined condition may be a condition regarding whether the deceleration target position is located at a distance that, using the current position as a reference, is the sum of a [distance reachable by the inertial force of the host vehicle when acceleration is stopped by turning off the accelerator at the current position (hereinafter, a "distance reachable by inertia")] and an [extra distance for securing the time required for calculating the regeneration upper limit operation amount and the safe deceleration required operation amount (hereinafter, an "extra distance reachable by inertia")]. Specifically, the control unit 81 acquires the current speed from the vehicle speed sensor 20 and calculates the extra distance reachable by inertia based on the acquired current speed. If the deceleration target position is located within the extra distance reachable by inertia ahead of the current position, the deceleration target position is determined to be the deceleration target position that matches the predetermined condition.

If it is determined that there is a deceleration target position (SA1: Yes), the regeneration upper limit operation amount calculation unit 81a calculates the regeneration upper limit operation amount (SA2). Operation amounts of the brake pedal in which only the regenerative brake operates and the friction brake does not operate can be found in advance in relation to the vehicle speed of the host vehicle. Therefore, data that specifies the correspondence relationship between such operation amounts of the brake pedal and the vehicle speed is stored in any format, such as a table or graph, in the data storage unit 82. Based on the current speed acquired from the vehicle speed sensor 20, the regeneration upper limit operation amount calculation unit 81a then refers to the data of the data storage unit 82 to calculate the regeneration upper limit operation amount. At such time, the regeneration upper limit operation amount calculation unit 81a may also refer to the battery charge information output from the battery control unit 50 and calculate the regeneration upper limit operation amount in consideration of the charging rate of the battery.

Next, the safe deceleration required operation amount calculation unit 81b calculates the safe deceleration required operation amount (SA3). If deceleration is performed at the safe deceleration G from the current position to the deceleration target position, for example, the operation amount of the brake pedal required for decelerating to the deceleration target speed at the deceleration target position can be calculated using a commonly known method, based on the current speed of the host vehicle, the deceleration target speed, and the distance to the deceleration target position. Thus, the safe deceleration required operation amount calculation unit 81b calculates the safe deceleration required operation amount based on the current speed acquired from the vehicle speed sensor 20, the deceleration target speed specified using a predetermined method, and the distance from the current position to the deceleration target position determined at SA1 as matching the predetermined condition. Here, the method of specifying the deceleration target speed may take on any form. For example, deceleration target speeds corresponding to deceleration target positions may be stored in advance in the map information DB 82a, and read out as necessary to specify the deceleration target speed. Alternatively, if the deceleration target position is a stop point, a stopping off location, or a destination, the deceleration target speed may be set to zero, whereas if the deceleration target position is the entry to a curve having at least a predetermined curvature, the deceleration target speed may be set to a speed at which the curve can be safely navigated by the host vehicle and a speed that corresponds to the curvature of the curve. The distance from the current position to the deceleration target position can be found from the deceleration target position determined as matching the predetermined condition, the current position of the host vehicle output from the current position detection processing unit 10, and the map information of the map information DB 82a.

Next, the guidance control unit 81d determines whether a predetermined display timing has been reached at which the regeneration upper limit operation amount and the safe deceleration required operation amount should be displayed (SA4). The method of specifying the display timing may take on any form, and the display timing may be set to any timing when it is effective to inform the driver of the host vehicle of the regeneration upper limit operation amount and the safe deceleration required operation amount. For example, if the accelerator pedal is not in use and deceleration target position is within the distance reachable by inertia as described above from the current position of the host vehicle, it is determined that some form of braking is required for safe deceleration and the display timing is determined as now. Here, whether the accelerator pedal is in use may be determined based on the accelerator pedal current operation amount output from the accelerator mechanism 30.

If the display timing is determined as now (SA4: Yes), the guidance control unit 81*d* displays the regeneration upper limit operation amount calculated at SA2 and the safe deceleration required operation amount calculated at SA3 on the display 60 in a predetermined display format (SA5). An example of the display will be described in more detail later.

Next, the guidance control unit 81*d* determines whether the brake pedal was operated (SA6). Specifically, the current operation amount acquisition unit 81*c* acquires the current operation amount of the brake pedal from the brake mechanism 40, and the guidance control unit 81*d* determines whether the brake pedal was operated based on the acquired current operation amount. If the brake pedal was operated (SA6: Yes), the guidance control unit 81*d* displays the current operation amount acquired by the current operation amount acquisition unit 81*c*, and both the regeneration upper limit operation amount and the safe deceleration required operation amount displayed at SA5, on the display 60 in a predetermined display format (SA7). An example of the display will be described in more detail later.

The control unit 81 subsequently monitors whether the host vehicle has reached the deceleration target position of SA1 (SA8). If the deceleration target position has not been reached (SA8: No), the control unit 81 proceeds to SA2. Similarly thereafter, the process from SA2 to SA8 is repeatedly performed until the host vehicle reaches the deceleration target position of SA1, such that the regeneration upper limit operation amount, the safe deceleration required operation amount, and the current operation amount are constantly updated to the latest value and displayed on the display 60. If the host vehicle has reached the deceleration target position of SA1 (SA8: Yes), the control unit 81 proceeds to SA1 and continuously monitors whether there is a subsequent deceleration target position ahead of the host vehicle (SA1). If there is a subsequent deceleration target position (SA1: Yes), the process from SA2 to SA8 is executed again for the subsequent deceleration target position. The process from SA2 to SA8 is similarly executed thereafter for each deceleration target position.

Display Examples

Examples of the display at SA5 and SA7 of FIG. 2 will be explained below. FIGS. 3A to 3C and FIGS. 4A to 4C show display examples of the regeneration upper limit operation amount, the safe deceleration required operation amount, and the current operation amount on the display 60.

Before explaining the individual content of the display examples, the display format shared by the display examples will be described. As shown in FIGS. 3A to 3C and FIGS. 4A to 4C, a display area 90 that displays the operation amount of the brake pedal is displayed on the display 60 (not shown in FIGS. 3A to 3C and FIGS. 4A to 4C). The display area 90 is shaped as a semi-circular area overall, and the bottom side is evenly divided into right and left sides around the center of curvature. One of the right and left sides (in this case, the left side in the drawings) indicates a position (hereinafter, a "non-operation position") P1 that corresponds to a non-operation state of the brake pedal. The other side among the right and left sides (in this case, the right side in the drawings) indicates a position (hereinafter, an "upper limit operation position") P2 that corresponds to the upper limit operation amount of the brake pedal (an operation amount when the brake pedal is depressed to a maximum extent, and an operation amount set depending on the mechanism of each vehicle). An area 91 spanning from the non-operation position P1 to the upper limit operation position P2 indicates an area that corresponds to the operation amount of the brake pedal.

The area 91 displays a current operation amount display section 92 that shows the current operation amount, a regeneration upper limit operation amount display section 93 that shows the regeneration upper limit operation amount, and a safe deceleration required operation amount display section (a deceleration required operation amount display section) 94 that shows the safe deceleration required operation amount. These amounts, using the upper limit operation amount of the brake pedal indicated at the upper limit operation position P2 as a reference, are displayed at positions that correspond to the degree of approach toward the upper limit operation amount. The specific display mode of these amounts may take on any farm, and the amounts are shown here as display needles that rotate around the center of curvature. The display needles are preferably displayed easily distinguishable from one another. For example, the current operation amount display section 92 may be shown with a black display needle, the regeneration upper limit operation amount display section 93 with a green display needle, and the safe deceleration required operation amount display section 94 with a red display needle.

Figure 3A:
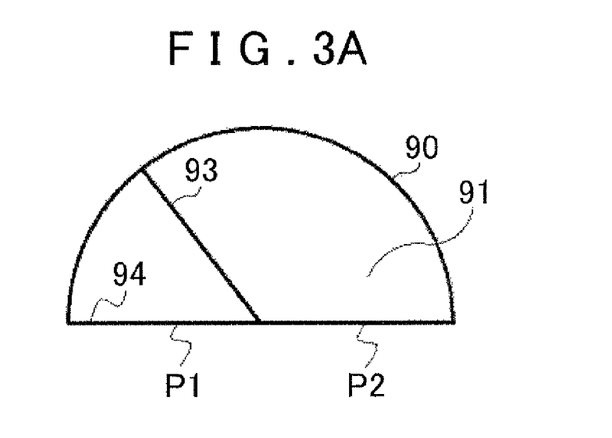
FIGS. 3A to 3C show display examples of a regeneration upper limit operation amount, a required operation amount for safe deceleration, and a current operation amount on a display.

FIG. 3A shows a display example when it is determined at SA4 in FIG. 2 that the display timing has been reached. At such time, the current vehicle speed is comparatively large. Therefore, the regeneration upper limit operation amount display section 93 is shown at a position relatively close to the non-operation position P1 because the regeneration upper limit operation amount is small. Looking at the regeneration upper limit operation amount display section 93, the driver can know that operating the brake pedal within the range of the brake pedal operation amount indicated as the area spanning from the non-operation position P1 to the regeneration upper limit operation amount display section 93 enables 100% recovery of the braking energy of the host vehicle. At this time, the deceleration target position is immediately after coming within the distance reachable by inertia from the current position of the host vehicle, and the safe deceleration required operation amount is practically zero. Therefore, the safe deceleration required operation amount display section 94 is shown at practically the same position as the non-operation position P1. By looking at the safe deceleration required operation amount display section 94, the driver can know that operating the brake pedal by an amount that is within a range of the brake pedal operation indicated as an area past the area spanning from the non-operation position P1 to the safe deceleration required operation amount display section 94 (the area spanning from the safe deceleration required operation amount display section 94 to the upper limit operation position P2), the vehicle speed can be slowed to the deceleration target speed at the deceleration target position by performing continuous deceleration at the target deceleration G (that is, deceleration can be safely achieved). Note that, because the driver is not operating the brake pedal at such time, the current operation amount display section 92 is not shown. By thus displaying the regeneration upper limit operation amount display section 93 and the safe deceleration required operation amount display section 94 using the same reference in the same display area 90, the driver can grasp the relative relationship between the regeneration upper limit operation amount and the safe deceleration required operation amount. Specifically, in the display example of FIG. 3A, the regeneration upper limit operation amount is larger than the safe deceleration required operation amount. Therefore, the driver can know that operating the brake pedal by an amount within the range of brake pedal operation indicated as the area between the regeneration upper limit operation amount display section 93 and the safe deceleration required operation amount display section 94 enables 100% recovery of the braking energy of the host vehicle, and also enables deceleration to the deceleration target speed at the deceleration target position by performing continuous deceleration at the target deceleration G.

Figure 3B:
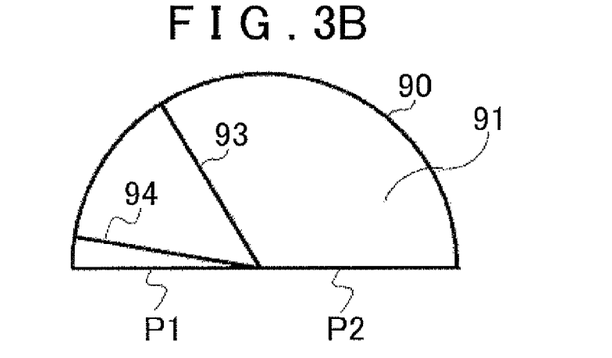

The display example in FIG. 3B shows a time when the host vehicle is closer to the deceleration target position than in FIG. 3A, the current speed is smaller than in FIG. 3A, and the driver has not yet operated the brake pedal. At such time, compared to the time in FIG. 3A, the regeneration upper limit operation amount has increased by an amount corresponding to the smaller current vehicle speed. Therefore, the regeneration upper limit operation amount display section 93 is shown at a position slightly closer to the upper limit operation position P2. Further, at this time, compared to the time in FIG. 3A, the safe deceleration required operation amount has also increased. Therefore, the safe deceleration required operation amount display section 94 is shown at a position slightly closer to the upper limit operation position P2. Note that, because the driver has not yet operated the brake pedal at such time, the current operation amount display section 92 is not shown.

Figure 3C:
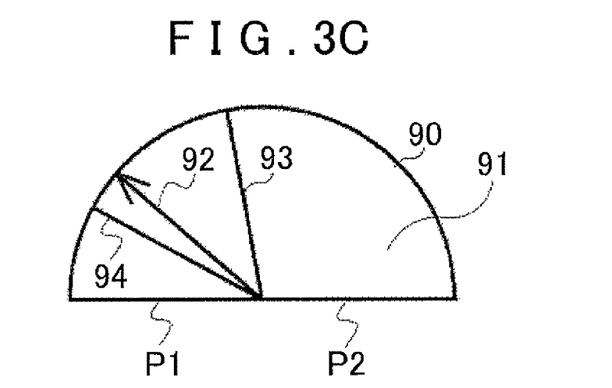

The display example in FIG. 3C shows a time when the host vehicle is closer to the deceleration target position than in FIG. 3B, the current speed is smaller than in FIG. 3B, and it is determined that the brake pedal has been operated at SA6 in FIG. 2. At such time, compared to the time in FIG. 3B, the regeneration upper limit operation amount has further increased by an amount corresponding to the smaller current vehicle speed. Therefore, the regeneration upper limit operation amount display section 93 is shown at a position slightly closer to the upper limit operation position P2. Further, at this time, compared to the time in FIG. 3B, the safe deceleration required operation amount has also increased. Therefore, the safe deceleration required operation amount display section 94 is shown at a position slightly closer to the upper limit operation position P2. Note that, because the driver is operating the brake pedal at such time, the current operation amount display section 92 is shown. By looking at the current operation amount display section 92, the driver can grasp the current operation amount relative to the regeneration upper limit operation amount and the safe deceleration required operation amount.

Figure 4A:
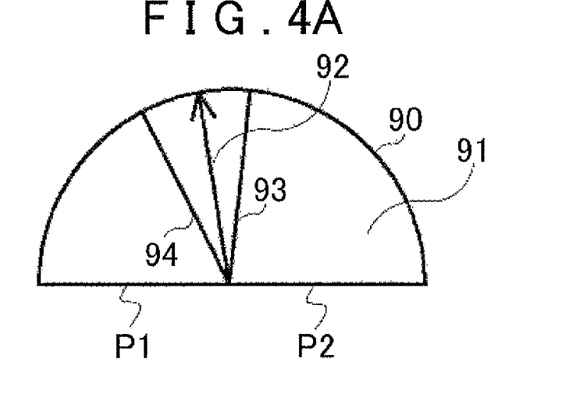

The display example in FIG. 4A shows a time when the host vehicle is closer to the deceleration target position than in FIG. 3C, the current speed is smaller than in FIG. 3C, and the deceleration target position has not yet been reached. At such time, compared to the time in FIG. 3C, the regeneration upper limit operation amount has further increased by an amount corresponding to the smaller current vehicle speed. Therefore, the regeneration upper limit operation amount display section 93 is shown at a position slightly closer to the upper limit operation position P2. Further, at this time, compared to the time in FIG. 3C, the safe deceleration required operation amount has also increased. Therefore, the safe deceleration required operation amount display section 94 is shown at a position slightly closer to the upper limit operation position P2. Note that, because the driver is operating the brake pedal at such time, the current operation amount display section 92 is shown.

Figure 4B:
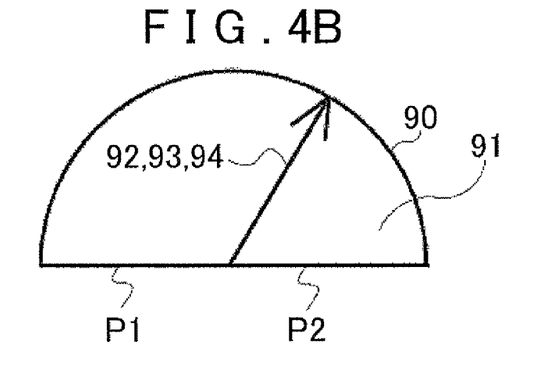

The display example in FIG. 4B shows a time when the host vehicle is closer to the deceleration target position than the time in FIG. 4A, and the current speed is smaller than in FIG. 4A. In addition, the display example in FIG. 4B shows a time immediately before arriving at the deceleration target position when the driver has performed a suitable brake operation. At such time, compared to the time in FIG. 4A, the current vehicle speed has decreased and the regeneration upper limit operation amount increased. Therefore, the regeneration upper limit operation amount display section 93 is shown at a position slightly closer to the upper limit operation position P2. Further, at this time, compared to the time in FIG. 4A, the safe deceleration required operation amount has also increased. Therefore, the safe deceleration required operation amount display section 94 is shown at a position slightly closer to the upper limit operation position P2. Since the driver has performed a suitable brake operation, the regeneration upper limit operation amount, the safe deceleration required operation amount, and the current operation amount coincide with one another, and the regeneration upper limit operation amount display section 93, the safe deceleration required operation amount display section 94, and the current operation amount display section 92 are all shown at the same position. Based on the above, the driver can know that the brake pedal operation amount that enables 100% recovery of the braking energy of the host vehicle coincides with the brake pedal operation amount that enables deceleration to the deceleration target speed at the deceleration target position by performing continuous deceleration at the target deceleration G, and also know that he or she is operating the brake pedal at an operation amount that matches the above coinciding brake pedal operation amounts (i.e., know that he or she is performing a suitable brake operation).

Figure 4C:
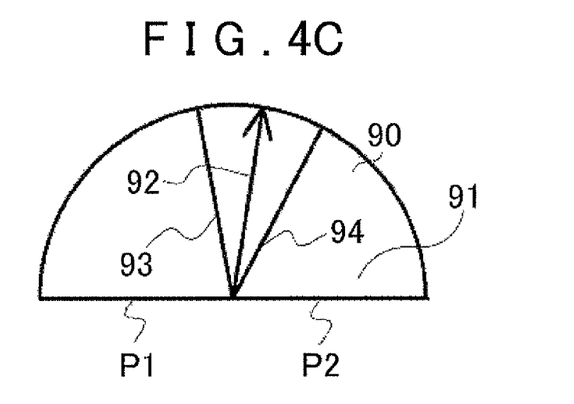

The display example in FIG. 4C shows a time when the host vehicle is closer to the deceleration target position than the time in FIG. 4A, and the current speed is smaller than in FIG. 4A. In addition, the display example in FIG. 4C shows a time immediately before arriving at the deceleration target position when the driver has performed a brake operation at a more delayed timing compared to FIG. 4B. At such time, compared to the time in FIG. 4B, the delayed brake operation results in a larger current vehicle speed and a smaller regeneration upper limit operation amount. Therefore, the regeneration upper limit operation amount display section 93 is shown at a position slightly closer to the non-operation position P1. Further, at this time, compared to the time in FIG. 4B, the safe deceleration required operation amount has also increased. Therefore, the safe deceleration required operation amount display section 94 is shown at a position slightly closer to the upper limit operation position P2. Due to the delayed brake operation, the regeneration brake alone is insufficient for slowing to the deceleration target speed at the deceleration target position. Therefore, the safe deceleration required operation amount exceeds the regeneration upper limit operation amount, and the safe deceleration required operation amount display section 94 is shown at a position closer than the regeneration upper limit operation amount display section 93 to the upper limit operation position P2.

Effects

According to the present example described above, the regeneration upper limit operation amount and the safe deceleration required operation amount are calculated, and a guidance control pertaining to the operation amount of the brake pedal is performed based on the regeneration upper limit operation amount and the safe deceleration required operation amount. Therefore, the driver can be provided with guidance based on the brake pedal operation amount that enables recovery of regeneration energy, and the brake pedal operation amount required for slowing the current speed of the vehicle to the deceleration target speed at the deceleration target position. Thus, the driver can perform a brake operation while knowing the regeneration upper limit operation amount and the deceleration required operation amount, and can easily perform deceleration that considers safety in addition to the efficient recovery of braking energy.

Further, the current operation amount is calculated in addition to the regeneration upper limit operation amount and the deceleration required operation amount, and a guidance control pertaining to the operation amount of the brake pedal is performed based on the regeneration upper limit operation amount, the deceleration required operation amount, and the current operation amount. Therefore, the driver can be provided with guidance based on the current operation amount, as well as the regeneration upper limit operation amount and the deceleration required operation amount. Thus, the driver can perform a brake operation that considers the current operation amount of the brake pedal as well as the regeneration upper limit operation amount and the deceleration required operation amount, and can more easily perform deceleration that considers safety in addition to the efficient recovery of braking energy.

The guidance control is performed using the upper limit operation amount of the brake pedal as a reference. Therefore, the driver can take into account the relative relationships among the regeneration upper limit operation amount, the deceleration required operation amount, and the current operation amount using the upper limit operation amount of the brake pedal as a reference.

The guidance control performed shows the current operation amount display section 92, the regeneration upper limit operation amount display section 93, and the deceleration required operation amount display section 94 within the display area 90 spanning from a position that corresponds to a non-operation state of the brake pedal to a position that corresponds to the upper limit operation amount of the brake pedal. Therefore, the driver can grasp the relative relationships among the regeneration upper limit operation amount, the deceleration required operation amount, and the current operation amount using the non-operation state and upper limit operation amount of the brake pedal as a reference. In addition, the driver can easily grasp these relative relationships by viewing the regeneration upper limit operation amount, the deceleration required operation amount, and the current operation amount that are shown on the same display area.

Modifications

An exemplary implementation of the inventive principles was explained above. However, the specific configuration and units for implementing these principles may be modified and improved in any manner or form within the scope of the technical ideas of the inventive principles. Examples of such modifications are explained below.

Problems to be Solved and Effects

The problems to be solved and the effects of the inventive principles described herein are not limited to the examples described herein and may vary depending on the environment in which the principles are applied and the detailed configuration of the implementation. The above problems may be only partially solved, and the above effects only partially achieved.

Constitution of the Host Vehicle

In the above example, the host vehicle is a hybrid vehicle. However, the an electric vehicle that uses only an electric motor as a drive source may be the host vehicle.

Deceleration Target Position

The determination regarding whether there is a deceleration target position is made based on the map information stored in the map information DB 82a. However, an area in front of the host vehicle may be imaged by a camera or the like and subject to image analysis to determine the existence of a feature ahead of the host vehicle and the type of feature, for example. It may be determined that there is a deceleration target position if the existence of a feature of a predetermined type (e.g. a stop sign) is determined.

Calculation Methods of the Regeneration Upper Limit Operation Amount, Required Deceleration Operation Amount, and Current Operation Amount The regeneration upper limit operation amount, the safe deceleration required operation amount, or the current operation amount may be calculated using a method other than the calculation methods described above. For example, gradient information pertaining to the gradient of the road surface from the current position to the deceleration target position may be included in the map information. The gradient information may then be read out from the map information as necessary and used in the calculation of these amounts. In addition, the guidance control may be performed based only on the regeneration upper limit operation amount and the safe deceleration required operation amount, with the current operation amount omitted. In this case as well, a display such as shown in FIGS. 3A and 3B may be used. Therefore, the driver can perform a brake operation while taking into account the regeneration upper limit operation amount and the safe deceleration required operation amount, and can easily perform deceleration that considers safety in addition to the efficient recovery of braking energy.

Deceleration Required Operation Amount

Guidance that further considers a comfortable deceleration required operation amount may be performed as guidance based on the deceleration required operation amount. Here, the comfortable deceleration required operation amount is a deceleration required operation amount when decelerating at a constant deceleration G from the current position to the deceleration target position. The comfortable deceleration required operation amount is also a deceleration required amount when deceleration is performed at a deceleration G at which the behavior of the host vehicle is stable and which the driver finds comfortable (hereinafter, a "comfortable deceleration G" and a fixed value of 0.2 G, for example). The method of guidance control that considers the comfortable deceleration required operation amount may be any method. For example, in the display examples of FIGS. 3A to 3C and 4A to 4C, the safe deceleration required operation amount display section 94, when shown, may be highlighted if the safe deceleration required operation amount equals the comfortable deceleration required operation amount. In such case, the driver can perform a brake operation while further knowing the comfortable deceleration required operation amount, and can easily perform deceleration that further considers comfort in addition to safety and the efficient recovery of braking energy.

Safe Deceleration G

A deceleration G different from that described in the example may also be applied as the safe deceleration G. For example, assuming that deceleration is ultimately performed at the comfortable deceleration G (a brake operation is performed at the comfortable deceleration required operation amount), a deceleration G required for performing constant deceleration from the current position to the deceleration target position to achieve the target deceleration speed may equal or exceed the comfortable deceleration G by a predetermined deceleration G. In such case, the host vehicle may be decelerated at an intermediary deceleration G (hereinafter, an "intermediate deceleration G") until the host vehicle reaches a position that is a predetermined distance ahead of the current position (hereinafter, an "intermediate position"), and then the host vehicle may be decelerated at the comfortable deceleration G until the host vehicle reaches the deceleration target position from the intermediate position. The safe deceleration G described above may be applied as the intermediate deceleration G. Further, a distance calculated based on the current speed of the host vehicle and the speed the host vehicle should use at the current position (a speed determined based on a deceleration curve for decelerating at the comfortable deceleration G up to the deceleration target position) may be applied as the predetermined distance. Specifically, the safe deceleration required operation amount calculation unit 81b may calculate a deceleration required operation amount for decelerating at the safe deceleration G from the current position to the intermediate position, based on the current speed of the vehicle, the speed the host vehicle should use at the current position, and the distance to the intermediate position. The guidance control unit 81d may then provide guidance to the driver regarding the deceleration required operation amount. If the intermediate position has been reached, the safe deceleration required operation amount calculation unit 81b may calculate the comfortable deceleration required operation amount for decelerating at the comfortable deceleration G from the intermediate position to the deceleration target position, based on the current speed of the host vehicle, the deceleration target speed, and the distance to the deceleration target position. The guidance control unit 81d may then provide guidance to the driver regarding the comfortable deceleration required operation amount. Thus, a different deceleration G may be applied as the targeted deceleration G depending on the need and a plurality of deceleration Gs may be combined in a multiple-stage manner.

Current Operation Amount

In the above example, the operation amount of the brake pedal was described as an amount excluding so-called play. However, such play may be included, and in this case, guidance is preferably provided to the driver such that the brake pedal operation amount that corresponds to play can be distinguished from the brake pedal operation amount that corresponds to non-play. As an example of such guidance, in the display examples of FIGS. 3A to 3C and 4A to 4C, a different color may be used to show an area that corresponds to the play operation amount of the brake pedal as another area among the area 91 that corresponds to the operation amount of the brake pedal.

Calculation Timing

The timing for calculating the regeneration upper limit operation amount, the safe deceleration required operation amount, the comfortable deceleration required operation amount, or the current operation amount may be a timing other than that described above. For example, although the regeneration upper limit operation amount and the safe deceleration required operation amount are calculated before determining whether the display timing has been reached, the regeneration upper limit operation amount and the safe deceleration required operation amount may be calculated after determining that the display timing has been reached.

Display Timing

The timing for displaying the regeneration upper limit operation amount, the safe deceleration required operation amount, the comfortable deceleration required operation amount, or the current operation amount on the display 60 may be a timing other than that described above. In the above example, an example of the timing for displaying the regeneration upper limit operation amount and the safe deceleration required operation amount is described as a time when the accelerator pedal is not in use and the deceleration target position is within a distance reachable by inertia from the current position of the host vehicle. However, regardless of whether the accelerator pedal is in use, the regeneration upper limit operation amount and the safe deceleration required operation amount may be displayed when the deceleration target position is within a distance reachable by inertia from the current position of the host vehicle, and releasing the accelerator pedal may be encouraged.

Support Content

The regeneration upper limit operation amount, the safe deceleration required operation amount, the comfortable deceleration required operation amount, or the current operation amount may be sequentially output, or in addition to the sequential output, when the respective amounts have finally reached a predetermined state or a predetermined relationship, notification that the final state has been reached may be output. For example, when the safe deceleration required operation amount exceeds the regeneration upper limit operation amount, guidance informing that safe deceleration cannot be achieved through the regeneration brake alone may be displayed on the display 60 and output by voice from the speaker 70.

Guidance Modes

Any guidance mode may be used in place of or in addition to the display on the display 60 regarding the regeneration upper limit operation amount, the safe deceleration required operation amount, the comfortable deceleration required operation amount, or the current operation amount. For example, output may be performed using the speaker 70. Examples of such output include the output of a sound informing that an amount is equal to or greater than a predetermined reference value, a sound informing that a relative relationship of the amounts is a predetermined relationship, or a sound supporting the driver's brake operation based on a relative relationship of the amounts. Specific examples of this last example include the output of a synthetic voice informing the driver to maintain the current pedal operation when the state of FIG. 4B is reached, and the output of a buzzer sound to warn the driver of delayed operation of the brake pedal when the state of FIG. 4C is reached.

Display Modes

Figure 5A:
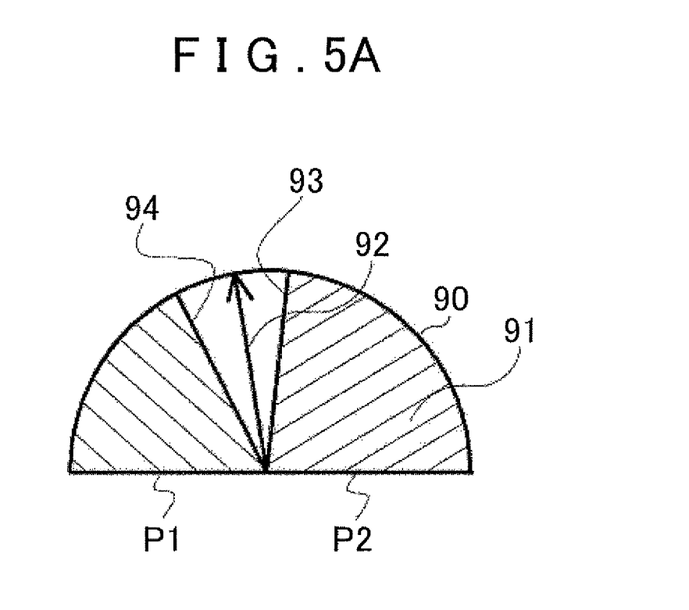
FIGS. 5A and 5B show modifications of the display examples of the regeneration upper limit operation amount, the required operation amount for safe deceleration, and the current operation amount on a display.
Figure 5B:
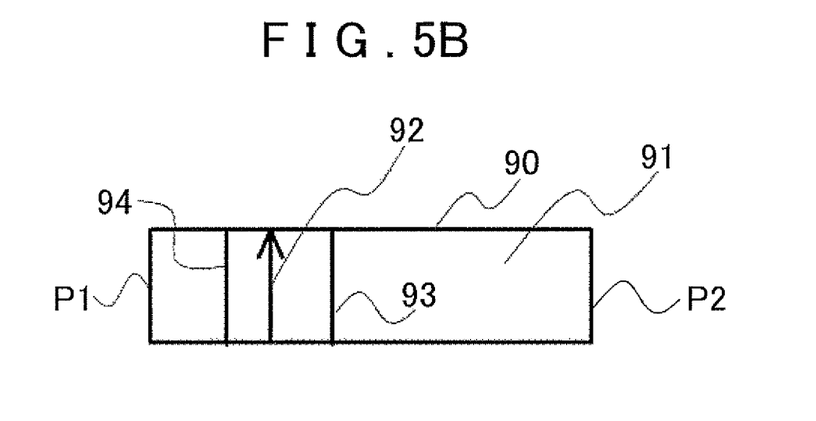

Even when display is performed using the display 60, the amounts may be displayed in a mode other than the display mode described above. For example, when using display needles to show the regeneration upper limit operation amount display section, the safe deceleration required operation amount display section, the comfortable deceleration required operation amount display section, or the current operation amount display section, in order to distinguish the amounts from one another, the thickness and type of display needle may be varied, or the flashing, lighting, and interval of the display needle may be varied. A display screen may also be used to display in place of the display needles. A display example using such a display screen is shown in FIG. 5A. In FIG. 5A, in the semi-circular display area 90 similar to that in FIGS. 3A to 3C, the regeneration upper limit operation amount display section 93 is shown on a display screen (a hatched screen in the drawing) that is continuous from the upper limit operation position P2, the safe deceleration required operation amount display section 94 is shown on a display screen (a hatched screen in the drawing) that is continuous from the non-operation position P1, and the current operation amount is shown using a display needle similar to that in FIGS. 3A to 3C. Alternatively, the display area may have a shape other than a semi-circular shape. A display example using a shape other than a semi-circular shape is shown in FIG. 5B. In FIG. 5B, the display area 90 is shaped as a horizontally long bar area overall. One of the right and left sides (in this case, the left side in the drawing) indicates the position (hereinafter, a "non-operation position") P1 that corresponds to a non-operation state of the brake pedal. The other side among the right and left sides (in this case, the right side in the drawing) indicates the position (hereinafter, an "upper limit operation position") P2 that corresponds to the upper limit operation amount of the brake pedal. The area 91 spanning from the non-operation position P1 to the upper limit operation position P2 indicates an area that corresponds to the operation amount of the brake pedal. The current operation display section 92, the regeneration upper limit operation amount display section 93, and the safe deceleration required operation amount display section 94 are shown in the area 91. Here, these sections are shown as display needles in a direction that is perpendicular to the lengthwise direction of the display area 90. The display needles are preferably displayed easily distinguishable from one another. For example, the current operation amount display section 92 may be shown with a black display needle, the regeneration upper limit operation amount display section 93 with a green display needle, and the safe deceleration required operation amount display section 94 with a blue display needle. Besides being shown on the display 60, the display area 90 used for display as shown in FIGS. 3A to 5B may be shown as a projection or the like near the speedometer or on the windshield.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is clamed is:

1. a guidance device that provides guidance regarding an operation amount of a brake pedal in a vehicle having a friction brake and a regenerative brake, the guidance device comprising: a controller configured to: acquire a current speed of the vehicle; calculate a regeneration upper limit operation amount, which is an upper limit value of the operation amount of the brake pedal when only the regenerative brake is operated, based on the current speed of the vehicle; acquire a deceleration target speed; acquire a deceleration target position; calculate a distance to the deceleration target position; calculate a deceleration required operation amount of the brake pedal required for reducing the current speed of the vehicle to the deceleration target speed at the deceleration target position based on the acquired current speed of the vehicle, the acquired deceleration target speed, and the calculated distance to the deceleration target position; acquire an upper limit operation amount of the brake pedal that corresponds to an amount of braking when the brake pedal is depressed to a maximum extent; acquire a current operation amount of the brake pedal; create: a current operation amount display section that shows the acquired current operation amount; a regeneration upper limit operation amount display section that shows the calculated regeneration upper limit operation amount; and a deceleration required operation amount display section that shows the calculated deceleration required amount; and cause the current operation amount display section, the regeneration upper limit operation amount display section, and the deceleration required operation amount display section to be simultaneously displayed on a display within a display area that represents the operation amount of the brake pedal and spans from a position that corresponds to a non-operation state of the brake pedal to a position that corresponds to the upper limit operation amount.

2. The guidance device according to claim 1, wherein the controller is configured to: acquire battery charge information output from a battery control unit in the vehicle; and calculate the regeneration upper limit operation amount based on the acquired battery charge information.

3. The guidance device according to claim 1, wherein: the deceleration target position is a stop point; and the deceleration target speed is set to zero.

4. The guidance device according to claim 1, wherein: the deceleration target position is a point at an entry to a curve; and the deceleration target speed is set to a speed at which the curve can be safely navigated by the vehicle.

5. The guidance device according to claim 1, wherein: the created guidance is communicated to the user by being displayed on a display; and the controller is configured to cause the created guidance to be displayed on the display at a specified display time.

6. The guidance device according to claim 5, wherein the controller is configured to calculate the specified display time as a time at which the deceleration target position is reachable by inertia of the vehicle and an acceleration pedal of the vehicle is not in use.

7. The guidance device of claim 1, wherein the guidance device is incorporated into a navigation device.

8. A guidance method for providing guidance regarding an operation amount of a brake pedal in a vehicle having a friction brake and a regenerative brake, the guidance method comprising: acquiring, with a controller, a current speed of the vehicle; calculating, with the controller, a regeneration upper limit operation amount, which is an upper limit value of the operation amount of the brake pedal when only the regenerative brake is operated, based on the current speed of the vehicle; acquiring, with the controller, a deceleration target speed; acquiring, with the controller, a deceleration target position; calculating, with the controller, a distance to the deceleration target position; calculating, with the controller, a deceleration required operation amount of the brake pedal required for reducing the current speed of the vehicle to the deceleration target speed at the deceleration target position based on the acquired current speed of the vehicle, the acquired deceleration target speed, and the calculated distance to the deceleration target position; acquiring, with the controller, an upper limit operation amount of the brake pedal that corresponds to an amount of braking when the brake pedal is depressed to a maximum extent; acquiring, with the controller, a current operation amount of the brake pedal; creating, with the controller: a current operation amount display section that shows the acquired current operation amount; a regeneration upper limit operation amount display section that shows the calculated regeneration upper limit operation amount; and a deceleration required operation amount display section that shows the calculated deceleration required amount; and causing, with the controller, the current operation amount display section, the regeneration upper limit operation amount display section, and the deceleration required operation amount display section to be simultaneously displayed on a display within a display area that represents the operation amount of the brake pedal and spans from a position that corresponds to a non-operation state of the brake pedal to a position that corresponds to the upper limit operation amount.

9. The guidance method according to claim 8, further comprising: acquiring battery charge information output from a battery control unit in the vehicle; and calculating the regeneration upper limit operation amount based on the acquired battery charge information.

10. The guidance method according to claim 8, further comprising: setting the deceleration target position at a stop point; and setting the deceleration target speed to zero.

11. The guidance method according to claim 8, further comprising: setting the deceleration target position at a point at an entry to a curve; and setting the deceleration target speed to a speed at which the curve can be safely navigated by the vehicle.

12. The guidance method according to claim 8, further comprising: communicating the created guidance to a user by displaying the guidance on a display; and causing the created guidance to be displayed on the display at a specified display time.

13. The guidance method according to claim 12, further comprising calculating the specified display time as a time at which the deceleration target position is reachable by inertia of the vehicle and an acceleration pedal of the vehicle is not in use.

14. a non-transitory computer-readable medium storing a computer executable program usable to provide guidance regarding an operation amount of a brake pedal in a vehicle having a friction brake and a regenerative brake, the program comprising: instructions for acquiring a current speed of the vehicle; instructions for calculating a regeneration upper limit operation amount, which is an upper limit value of the operation amount of the brake pedal when only the regenerative brake is operated, based on the current speed of the vehicle; instructions for acquiring a deceleration target speed; instructions for acquiring a deceleration target position; instructions for calculating a distance to the deceleration target position; instructions for calculating a deceleration required operation amount of the brake pedal required for reducing the current speed of the vehicle to the deceleration target speed at the deceleration target position based on the acquired current speed of the vehicle, the acquired deceleration target speed, and the calculated distance to the deceleration target position; instructions for acquiring an upper limit operation amount of the brake pedal that corresponds to an amount of braking when the brake pedal is depressed to a maximum extent; acquiring a current operation amount of the brake pedal; creating: a current operation amount display section that shows the acquired current operation amount; a regeneration upper limit operation amount display section that shows the calculated regeneration upper limit operation amount; and a deceleration required operation amount display section that shows the calculated deceleration required amount; and instructions for causing the current operation amount display section, the regeneration upper limit operation amount display section, and the deceleration required operation amount display section to be simultaneously displayed on a display within a display area that represents the operation amount of the brake pedal and spans from a position that corresponds to a non-operation state of the brake pedal to a position that corresponds to the upper limit operation amount.

* * * * *